(12) United States Patent
Grüner (10) Patent No.: US 12,533,212 B2
(45) Date of Patent: Jan. 27, 2026

(54) SURGICAL HF DEVICE AND METHOD FOR IDENTIFYING AND OPERATING SURGICAL HF INSTRUMENTS

(71) Applicant: KARL STORZ SE & Co. KG, Tuttlingen (DE)

(72) Inventor: Sven Axel Grüner, Tuttlingen (DE)

(73) Assignee: KARL STORZ SE & Co. KG, Tuttlingen (DE)

( * ) Notice: Subject to any disclaimer, the term of this patent is extended or adjusted under 35 U.S.C. 154(b) by 0 days.

(21) Appl. No.: 19/066,638

(22) Filed: Feb. 28, 2025

(65) Prior Publication Data

US 2025/0275831 A1    Sep. 4, 2025

(30) Foreign Application Priority Data

Mar. 1, 2024  (DE) .................... 10 2024 106 020.4

(51) Int. Cl.
*A61B 90/98* (2016.01)
*A61B 18/14* (2006.01)
*G06K 7/10* (2006.01)
*G06K 19/07* (2006.01)

(52) U.S. Cl.
CPC .......... *A61B 90/98* (2016.02); *A61B 18/1482* (2013.01); *G06K 7/10297* (2013.01); *G06K 19/0723* (2013.01)

(58) Field of Classification Search
CPC ............................ A61B 90/98; A61B 18/1482; G06K 7/10297; G06K 19/0723
USPC ........................................................ 235/451
See application file for complete search history.

(56) References Cited

U.S. PATENT DOCUMENTS

| | | | |
|---|---|---|---|
| 8,454,613 B2* | 6/2013 | Tethrake | A61B 90/00 606/86 R |
| 9,179,912 B2* | 11/2015 | Yates | A61B 90/98 |
| 2010/0262139 A1* | 10/2010 | Beller | A61B 90/98 606/41 |
| 2017/0273733 A1* | 9/2017 | Weber | A61B 18/1402 |
| 2021/0204936 A1* | 7/2021 | Meyer | A61B 90/98 |

(Continued)

FOREIGN PATENT DOCUMENTS

DE   102005044918 A1   2/2007
DE   20 2018 107 047 U1   1/2019

(Continued)

*Primary Examiner* — Michael G Lee
*Assistant Examiner* — David Tardif
(74) *Attorney, Agent, or Firm* — McGlew and Tuttle, P.C.

(57) ABSTRACT

A surgical HF device (4) and method identify and operate surgical HF instruments (1, 1'). The surgical HF device includes a surgical HF instrument and an HF generator (3) which has a HF socket (32) for connecting the HF instrument. A RFID reading unit (33) is assigned to the HF socket. The HF instrument has a RFID transponder tag (15, 15). The HF device has a HF cable (2, 2') with an instrument-side connection device (24) for separable connection to the HF instrument. A generator-side plug connector (22) has a separable connection to the HF socket. The HF cable provides an RF transmission device (21', 21") to transmit an RF field generated by the RFID reading unit as a communications connection between the RFID transponder tag and the RFID reading unit which is assigned to the HF socket, which is separably connected to the HF instrument by the HF cable.

13 Claims, 1 Drawing Sheet

(56) References Cited

U.S. PATENT DOCUMENTS

2021/0353950 A1* 11/2021 Gramoli ................ A61N 1/403
2025/0082433 A1* 3/2025 Machill ............ G06K 19/07758

FOREIGN PATENT DOCUMENTS

| DE | 20 2018 107 048 U1 | 1/2019 |
| DE | 20 2018 107 049 U1 | 1/2019 |
| DE | 102019102685 A1 | 8/2020 |

* cited by examiner

SURGICAL HF DEVICE AND METHOD FOR IDENTIFYING AND OPERATING SURGICAL HF INSTRUMENTS

CROSS REFERENCE TO RELATED APPLICATIONS

This application claims the benefit of priority under 35 U.S.C. § 119 of German Application 10 2024 106 020.4, filed Mar. 1, 2024, the entire contents of which are incorporated herein by reference.

TECHNICAL FIELD

The invention relates to a surgical high-frequency (HF) device (also electrosurgical device) having at least one surgical HF instrument (also electrosurgical instrument) and one HF generator, as well as a method for identifying and operating surgical HF instruments using the surgical HF device.

BACKGROUND

The abbreviation RFID (radio-frequency identification) refers to transmitter-receiver systems consisting of a transponder and a reader for the automatic and contactless identification of objects. The transponder, which is placed on or in the object to be identified, has electronics with a memory in which identification information is stored and an antenna for exchanging data with the reader by means of high-frequency alternating electromagnetic fields (RF fields). The reader, which may be coupled to a data processing unit, also has an antenna for coupling to the transponder. Furthermore, the reader may also be designed for writing, and the memory of the transponder may be a writable memory. For short transmission distances, a passive transponder may be used, which is also supplied with energy via the RF field. For longer ranges, the use of active transponders having their own power supply is required.

RFID has been used in healthcare for around two decades, not only to wirelessly identify surgical instruments, but also for medicines, consumables, hospital beds, and much more. In addition to fixed general information (e.g., manufacturer, article number, weight, etc.) and individual features (e.g., manufacturing or expiration date, serial number, etc.), RFID also makes it possible to store data that arises only during use (usage counter, processing counter, date of last sterilization, date of last maintenance, etc.) and to evaluate it for appropriate purposes.

Various automatic security and documentation systems for individually identifiable medical instruments and products with RFID tags are known from the utility models DE 20 2018 107 047 U1, DE 20 2018 107 048 U1, and DE 20 2018 107 049 U1. The systems each comprise several RFID readers for different reading areas (e.g., sterile operating field and contaminated region), wherein the RFID readers are connected to a data processing unit. This is designed to automatically detect instruments and products that are equipped with corresponding RFID tags. These are brought into the reading area of the relevant RFID reader. The data processing unit records and evaluates various data. Logistics processes with RFID-marked products can thus be safely monitored in critical security zones. In addition, the assembly of surgical instruments and counting control in the operating room are simplified. There is no differentiation between the individual instruments used in a reading area, such as the operating field-for example, with regard to their exact location or connection.

U.S. Pat. No. 8,454,613 B2 discloses an RFID system having a reader for surgical instruments to determine the need for action with regard to a surgical instrument, e.g., for its preparation or sorting. For this purpose, each surgical instrument has an RFID transponder tag embedded in the handle in a portion of non-conductive material. The reader generates a radio frequency (RF) field of sufficient strength in the vicinity of the surgical instrument to cause the RFID transponder tag to emit a signal containing stored identification information, which signal is received by the reader. The RFID reader may be a mobile, stand-alone reader that can be brought close to the surgical instrument, or it may be a fixed reader-for example, above a conveyor belt that transports surgical instruments.

DE 10 2005 044 918 A1 concerns surgical instruments for electro-or radio-frequency surgery (HF surgery) and describes an RFID system for contactless identification and communication between an HF generator and the instruments connected thereto. For this purpose, the instruments have an instrument plug connector that can be inserted into corresponding sockets of the HF generator and has a transponder. This comprises an instrument antenna and a writable and readable data memory assigned to the relevant instrument. The connector sockets on the HF generator are assigned generator antennas, which are connected to at least one write and read unit.

This allows the HF generator to set the (maximum) voltage and operating mode at each connection according to the relevant HF instrument and thus exclude critical operating conditions or incorrect operation. For service purposes, this also makes it possible to determine how often an HF instrument has been used, but only if the instrument plug connector is securely and permanently connected to the HF instrument.

A clear assignment of HF instruments that are connected to an HF generator via a separable cable connection is therefore not possible. This also applies to HF instruments that are modularly constructed from a handle, shaft, and tool insert, since these are also connected to an HF generator via a separable cable connection and, after use, are disconnected from the HF cable and disassembled into their modular components for processing. After cleaning and disinfection, these are usually not used again in the same combination in a modular instrument, or, if so, only by chance.

SUMMARY

Based upon this prior art, it is an object of the present invention to provide an RFID system for identifying surgical HF instruments that are connected to an HF generator via a separable or replaceable HF cable.

This object is achieved by a surgical HF device having surgical HF device features according to the invention.

The further object of providing a method for identifying and operating wireless surgical HF instruments which are connected to an HF generator via a separable or replaceable HF cable is achieved by the method having method features according to the invention.

Further developments of the device and method according to the invention are set out in this disclosure.

According to a first embodiment of the surgical HF device according to the invention, it has at least one surgical HF instrument and an HF generator which has at least one HF socket for connecting the HF instrument or, correspondingly, the HF instruments. In addition, the HF generator has at least one RFID reading unit which is assigned to the at least one HF socket. The or each HF instrument of the HF device has at least one RFID transponder tag, and the HF device comprises at least one HF cable for separably connecting the HF instrument to the HF socket or one of the HF sockets of the HF generator. For this purpose, the HF cable has an instrument-side connection device for separable connection to the HF instrument and a generator-side plug connector that can be separably plugged into the HF socket of the HF generator.

According to the invention, the HF cable provides an RF transmission device which is configured to transmit an RF field generated by the RFID reading unit as a communications connection between the at least one RFID transponder tag of the HF instrument and the RFID reading unit which is assigned to the HF socket, which is separably connected to the wireless HF instrument by the HF cable.

In this way, the HF generator allows clear identification of wireless HF instruments that are connected to the HF generator for HF operation via an exchangeable HF cable.

In the present case, the terms high frequency (HF) and radio frequency (RF), which cover the same frequency range, are used to distinguish the electrosurgical components of the device and their electrosurgical operation, which are referred to as HF, from the communications components of the device and their communications operation, which are referred to as RF.

The RFID reading unit of the HF generator is a communications unit that has a generator antenna connected to a data processing unit. The generator antenna is assigned to the HF socket. In the case of an HF generator having several HF sockets, each of which is assigned an RFID reading unit, this means that each HF socket is assigned a generator antenna, wherein the generator antennas are connected either each to their own data processing unit or to a common data processing unit.

For RFID logistics systems in healthcare, RF communications parameters are typically defined in a standard such as ISO/IEC 18000. The RF identification of the device according to the invention may be carried out with communications parameters according to this standard, so that the at least one RFID transponder tag of the HF instrument, which allows improved HF operation, can also be used without additional effort in the RFID logistics systems of the healthcare sector known from the state of the art.

The number of HF cables of the HF device may, but does not have to, correspond to the number of HF sockets on the HF generator, so that several HF instruments can be connected to and operated simultaneously on the HF sockets of the HF generator. Furthermore, it is possible that an HF system comprising the HF device may have more HF cables than the HF device has HF jacks. An HF system may also have different HF cables, which can differ, for example, in terms of material, length, or diameter.

According to a further embodiment of the HF device according to the invention, the RF transmission device may be either a wired RF transmission device or a wireless RF transmission device. The RF transmission device has a generator-side antenna in or on the generator-side plug connector and an instrument-side antenna in or on the instrument-side connection device, wherein the generator-side antenna and the instrument-side antenna are in a wired or wireless communicative connection, respectively.

A further embodiment of the HF device according to the invention provides that the wired RF transmission device for communicatively connecting the generator-side antenna and the instrument-side antenna have at least one communications line, e.g., a coaxial line, which extends along one of the HF cables. According to yet another embodiment, the alternative wireless RF transmission device has at least one RFID signal amplifier, also called a repeater, for communicatively connecting the generator-side antenna and the instrument-side antenna, which repeater is arranged in or on the HF cable, e.g., in or on the instrument-side connection device or the generator-side plug connector. The wireless RF transmission device for the RFID signal amplifier has a device for providing electrical energy from the RF field of the RFID reading unit or from an electromagnetic frequency field of an HF power supply of the HF generator. An example of such a device for providing electrical energy is a supercapacitor.

According to a further embodiment of the HF device according to the invention, the generator-side antenna is adapted with regard to its dimensions to the dimensions of a generator antenna of the RFID reading unit. Alternatively or additionally, the dimensions of the instrument-side antenna are adapted to the dimensions of a transponder antenna of the RFID transponder tag. For example, if the generator antenna and the transponder antenna are circular antenna coils, the generator-side antenna and the instrument-side antenna may each be wound as circular antenna coils such that the diameter of the generator-side antenna and the instrument-side antenna correspond to the diameter of the generator antenna and the transponder antenna, respectively. Of course, it is also possible that the antenna coils can have a shape other than circular. Furthermore, the number of turns of the generator-side antenna can correspond to a number of turns of the transponder antenna, and a number of turns of the instrument-side antenna can correspond to a number of turns of the generator antenna. Alternatively, it is also possible to use antenna coil combinations with different winding ratios. In particular, if the dimensions of the antenna coils differ, the ratio of the number of turns may be adjusted accordingly.

According to yet another embodiment of the HF device according to the invention, the HF instrument is a modular HF instrument having a shaft, a surgical tool, and a handle. With an HF instrument of modular design (also called a "modular HF instrument"), the instrument components of shaft, tool, and handle can be individually assembled from a kit system, and can be easily separated after use and prepared for re-use. There are two- or three-part modular instruments that have one or two interfaces for the separable connection of the shaft to the handle and/or to the tool. For example, in a two-part modular HF instrument, the handle and shaft may be reversibly separably connected, while the shaft is inseparably connected to the tool. Or the tool and the shaft may be reversibly separable, and the shaft may be inseparably connected to the handle. In a three-part modular HF instrument, all three instrument components, i.e., the handle and the shaft and the tool, are reversibly separable.

For identification with an HF generator, the distal tool of an HF instrument is crucial, because it determines the voltage at which and how often an HF instrument can be operated. The shaft, handle, and HF cable are usually configured to be robust enough to withstand more voltage than any tool that can be connected thereto. Therefore, the at least one RFID transponder tag is assigned to the tool and arranged on or in the tool or-in the two-part HF instrument with a handle that can be separated from the shaft-in or on the shaft that is inseparably connected to the tool.

When arranging the RFID transponder tag, it must be taken into account that it is within the range of the instrument-side connection device or the instrument-side antenna of the HF transmission device when the RF instrument is connected to the HF cable. Typically, an HF cable is connected to the handle of an HF instrument, such that the RFID transponder tag can preferably be located close to the handle. If the shaft is inseparably connected to the tool, the RFID transponder tag assigned to the tool may, for example, also be arranged at an end of the shaft close to the handle. If the tool is inseparably connected to an actuating rod that extends through the shaft into the handle in the assembled HF instrument to be coupled there to an actuating element, it is possible to arrange the RFID transponder tag assigned to the tool on a proximal portion of the actuating rod. And, depending upon the length of the shaft, the location of the connection on the HF instrument for the HF cable, and the range of the RF transmission device or, if applicable, the presence of a signal amplifier, it is also possible to arrange the RFID transponder tag assigned to the tool on a proximal connection portion of the tool with the shaft if communication with the RFID transponder tags of another instrument is excluded.

The connection on the HF instrument for separable connection to the HF cable on the handle may be provided, for example, by an HF instrument socket, so that the instrument-side connection device of the HF cable can be an instrument-side plug connector. The arrangement of the RFID transponder tag may preferably be based upon the position of the HF instrument socket on the handle.

According to a further embodiment of the HF device according to the invention with modular HF instruments having a first RFID transponder tag assigned to the tool, a second RFID transponder tag may be associated with the shaft and arranged on or in the shaft or the handle inseparably connected thereto. As before, the position of the HF connection or the HF instrument socket on the handle must also be taken into account when arranging the RFID transponder tag, so that an RFID transponder tag assigned to the shaft is preferably placed at the proximal end of the shaft closest to the handle or on the handle that is inseparably connected thereto, e.g., near the HF instrument socket. Alternatively or additionally, a third RFID transponder tag may be assigned to the handle, and/or a fourth RFID transponder tag may be assigned to the HF cable. The third RFID transponder tag may be arranged on or in the handle—preferably also near the HF instrument socket. The fourth RFID transponder tag assigned to the HF cable may be located on or in the HF cable. And, unlike the RFID transponder tags assigned to the HF instrument or the instrument components of a modular HF instrument, the fourth RFID transponder tag may be arranged either within range of the instrument-side antenna, e.g., on or in the instrument-side connection device, or in the region of the generator-side plug connector, in order to be within range of the assigned RFID reading unit when connected to an HF socket.

Furthermore, according to yet another embodiment of the HF device according to the invention, it is provided that the or each RFID transponder tag have a writable memory in order to store, for example, usage data. Accordingly, the RFID reading unit is configured for reading and writing and is connected to a control unit of the HF generator, which, for example, logs the usage data of the identified HF instrument and passes it on to the RFID reading unit or its data processing unit for transmission to the RFID transponder tag of the identified HF instrument.

A method according to the invention for identifying and operating surgical HF instruments using a surgical HF device according to the invention comprises, according to a first embodiment, the following steps:

providing the at least one HF cable with the RF transmission device for connecting the at least one HF instrument, which has the at least one RFID transponder tag, to the at least one HF socket of the HF generator to which the at least one RFID reading unit is assigned, separably connecting the instrument-side connection device of the HF cable to the HF instrument and separably connecting the generator-side plug connector to the HF socket of the HF generator, via the RF transmission device of the HF cable, transmitting an RF field generated by the RFID reading unit as a communications connection between the at least one RFID transponder tag of the HF instrument and the RFID reading unit which is assigned to the HF socket, which is separably connected to the HF instrument by the HF cable, detecting at least one data signal of the at least one RFID transponder tag by the RFID reading unit, wherein the data signal has at least one piece of information for identifying the HF instrument, and based upon the detected data signal, identifying the HF instrument which is connected via the HF cable to the HF socket to which the RFID reading unit is assigned, and putting the HF device into operational readiness for the HF operation of the identified HF instrument.

In a further development of the method, putting the HF device into operational readiness may comprise enabling an HF voltage at the HF socket by a control unit, connected to the RFID reading unit, of the HF generator after identification of the HF instrument that is connected to the HF socket via the HF cable.

According to a further embodiment of the method according to the invention, the data signal further comprises at least one limit specification for at least one HF operating parameter for the HF operation of the HF instrument, wherein the HF operating parameter is selected from a group having at least one continuous operation HF voltage, a peak load HF voltage, a continuous operation HF power, an HF power in peak load, an HF operating time in continuous operation, an HF operating time in peak load, an HF operating frequency in continuous operation, and an HF operating frequency in peak load.

Putting the HF device into operational readiness may then comprise at least one of the following steps:

displaying the at least one limit specification for the at least one HF operating parameter for the HF operation of the HF instrument on a display device of the HF generator;

limiting the HF operation of the identified HF instrument with respect to the at least one HF operating parameter in accordance with the limit specification by a control unit, connected to the RFID reading unit, of the HF generator.

According to yet another embodiment of the method according to the invention, it may be provided that, during HF operation of the HF instrument, usage data be logged by the RFID reading unit, wherein the usage data relate to at least one HF operating parameter from a group that has at least an HF voltage, an HF power, an HF operating time, and an HF operating frequency, and the at least one RFID transponder tag of the HF instrument be written with the logged usage data via the communications connection by the RFID reading unit.

A further embodiment of the method according to the invention relates to the identification and operation of an HF instrument, which is a modular HF instrument with a tool, a shaft, and a handle. A first RFID transponder tag is assigned to the tool. The modular HF instrument has a second RFID transponder tag assigned to the shaft and/or a third RFID transponder tag assigned to the handle. A first data signal of the first RFID transponder tag contains at least one piece of information for identifying the tool, a second data signal of the second RFID transponder tag contains at least one piece of information for identifying the shaft, and a third data signal of the third RFID transponder tag contains at least one piece of information for identifying the handle. When the modular HF instrument is connected to an HF socket of the HF generator via the HF cable, not only the first data signal, but also—depending upon the RFID transponder tags present on the modular HF instrument—the second and/or third data signals is/are recorded via the communications connection by the RFID reading unit. The identification of the modular HF instrument, which is connected via the HF cable to the HF socket to which the RFID reader is assigned, includes the identification of the tool as well as the shaft and/or handle from which the modular HF instrument is constructed.

This also makes it possible to check the compatibility of the instrument components. If it is determined that individual instrument components preclude use with certain other instrument components, the HF socket will not be enabled for HF operation, possibly accompanied by a corresponding indication on the generator's display device.

According to a further development of the method according to the invention for identifying and operating the modular HF instrument, the first data signal further has at least one first limit specification for at least one HF operating parameter for the HF operation of the tool, and the second data signal at least one second limit specification for at least one HF operating parameter for the HF operation of the shaft, and the third data signal at least one third limit specification for at least one HF operating parameter for the HF operation of the handle. The HF operating parameter is selected from the group having at least a continuous operation HF voltage, a peak load HF voltage, a continuous operation HF power, a peak load HF power, an HF operating time in continuous operation, an HF operating time in peak load, an HF operating frequency in continuous operation, and an HF operating frequency in peak load. Putting the HF device into operational readiness comprises the step of:
  comparing the first, second, and third limit specifications for the at least one HF operating parameter for the HF operation of the tool, the shaft, and the handle by the RFID reading unit or the control unit of the HF generator connected thereto, and determining therefrom a common limit specification for the at least one HF operating parameter for the HF operation of the modular HF instrument; and at least one of the steps of:
  displaying the common limit specification for the at least one HF operating parameter for the HF operation of the modular HF instrument on a display device of the HF generator; and/or
  limiting the HF operation of the modular HF instrument with respect to the at least one HF operating parameter in accordance with the common limit specification by the control unit, connected to the RFID reading unit, of the HF generator.

A further embodiment of the method according to the invention provides that the establishment of the communications connection between the at least one RFID transponder tag of the HF instrument and the RFID reading unit which is assigned to the HF socket, which is separably connected to the HF instrument via the HF cable, and putting the HF device into operational readiness for the HF operation of the identified HF instrument not take place simultaneously, but instead with a time delay, in order to avoid electromagnetic influences from the HF operation during the RF communication.

Further embodiments, as well as some of the advantages associated with these and other embodiments, are made apparent and better understood from the following detailed description with reference to the accompanying single figure, which is a schematic representation. The drawings, the description, and the claims contain numerous features in combination. It is understood that the features mentioned above and those to be explained below can be used not only in the combination specified in each case, but also in other combinations or on their own, without departing from the scope of the present invention. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
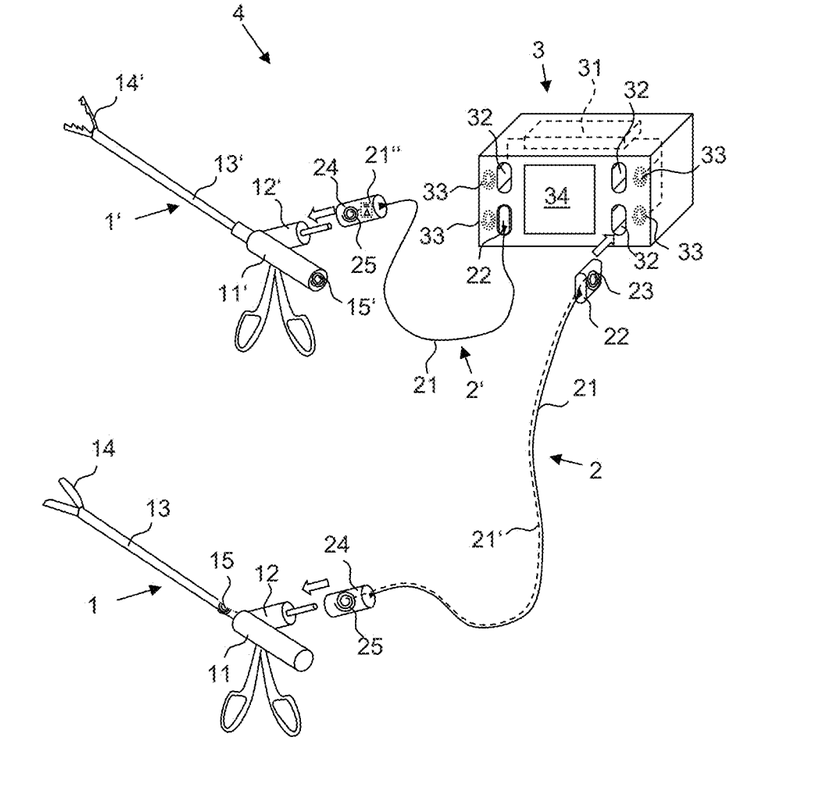
FIG. 1 is a perspectival view of an HF device having two HF instruments and HF cables in different embodiments of the invention.

Referring to the drawings, in the single FIG. 1, the HF device 4 is shown with two medical instruments 1, 1', two HF cables 2, 2', and an HF generator 3 having four HF sockets 32. Of course, modifications of the HF device 4 shown are conceivable both with regard to the number of HF sockets 32 of the HF generator 3 and with regard to the number of instruments 1, 1' that can each be connected thereto via an HF cable 2, 2'. In addition, connectable HF instruments may differ from the HF instruments 1, 1' shown by way of example. The invention is not limited to, as shown in the single FIG. 1, different HF instruments 1, 1' being connected to the HF generator 3 with different HF cables 2, 2'. It is, just as well, possible for different HF instruments to be connected via similar HF cables and for similar HF instruments to be connected via different HF cables, and, of course, similar HF instruments to be connected with similar HF cables.

Each HF cable 2, 2' of the HF device 4 comprises a cable bundle 21 having an instrument-side connection device 24 and a generator-side plug connector 22 for the HF operation of a connected HF instrument 1, 1', such that the HF cable 2, 2' can be separably connected both to the HF instrument 1, 1' and to the HF socket 32 of the HF generator 3. The HF generator 3 has, in order to identify the HF instruments 1, 1' connected thereto, for each HF socket 32, an RFID reader 33, the range of which is extended by means of an HF cable 2, 2' such that identification information can be read out which is stored in an RFID transponder tag 15, 15', which is present on or in the HF instrument 1, 1' connected to the HF cable 2, 2'. For this purpose, each HF cable 2, 2' has an HF transmission device 21', 21", through which an RF field is transmitted that is generated by the RFID reading unit 33 of the assigned HF socket 32. In this way, a communications connection with a significantly increased transmission distance is obtained between the RFID transponder tag 15, 15' of the HF instrument 1, 1' and the RFID reading unit 33 of the assigned HF socket 32.

It is also possible to retrofit existing HF cables with an RF transmission device in order to obtain an HF device 4 according to the invention, in conjunction with an HF generator with RFID reading unit and at least one HF instrument with RFID transponder tag. By means of the HF cable 2, 2', it is possible to extend the range of the RFID reading unit 33, which otherwise is usually in the range of a few centimeters-depending upon the length of the HF cable 2, 2', possibly to several meters—in order to be able to read and write an RFID transponder tag 15, 15' attached to an HF instrument 1, 1'.

In the figure, two alternatively usable HF cables 2, 2' with different RF transmission devices 21', 21" are shown, each having a generator-side antenna 23 on the generator-side plug connector 22 and an instrument-side antenna 25 on the instrument-side connection device 24. A first HF cable 2 has a wired RF transmission device 21' in which the generator-side antenna 23 and the instrument-side antenna 25 are connected by a communications line 21', e.g., a coaxial line. The communications line 21' extends along the cable bundle 21 of the HF cable 2 and may, for example, be integrated into the sheath of the HF cable 2.

In contrast to the first HF cable 2, the second HF cable 2' additionally has an RFID signal amplifier 21" or repeater as a wireless RF transmission device 21", which amplifies the communicative connection between the generator-side antenna 23 and the instrument-side antenna 25 of the HF cable 2'. In the example shown, the RFID signal amplifier 21" is housed in the instrument-side connection device 24 of the HF cable 2' and comprises a device for providing electrical energy from the RF field of the RFID reading unit 33 or from an electromagnetic frequency field of the HF power supply of the HF generator 3. For example, a super-capacitor or the like may be used to store energy that is obtained from the RF field or the HF voltage in the HF cable 2'. This would temporarily provide enough energy to operate an active amplifier or relay station for the communications link in both directions. Although this RFID signal amplifier circuit takes up more space within the plug connector, it allows for longer cables, smaller generator-side and instrument-side antennas, and greater distances from the RFID transponder tag.

The alternative, purely passive range extension through the HF cable 2 of the wired RF transmission device 21', on the other hand, is advantageously space-saving, inexpensive, and simple. Thus, an existing HF system, which has an HF generator 3 with RFID reading units 33 on the HF sockets 32 and HF instruments 1, 1' with RFID transponder tags 15, 15', can be easily retrofitted with an RF transmission device 21' using an HF cable 2 according to the invention. This is because the two antenna coils 23, 25 connected via the coaxial cable 21' can be accommodated in the generator-side plug connector 23 and the instrument-side connection device 24 without deviations from the conventional plug connector design. The two antennas 23, 25 may, for example, be wound as circular ring coils, wherein their diameter approximately corresponds to that of the relevant counterpart. This means that the diameter of the generator-side antennas 23 corresponds approximately to the diameter of the generator antenna of the RFID reading unit 33, and the diameter of the instrument-side antenna coil 25 corresponds approximately to the diameter of the transponder antenna of the RFID transponder tag 15, 15'. The number of turns, however, is cross-reversed, i.e., the number of turns of the generator-side antenna 23 corresponds to the number of turns of the transponder antenna, and the number of turns of the instrument-side antenna 25 corresponds to the number of turns of the generator antenna.

The shape, dimensions, and number of turns of the coils forming the antennas 23, 24 are not limited to this example. Alternative coil shapes may deviate from the circular shape and, for example, be rounded, rectangular, or square. Alternatively, the coils may also be formed in a flat spiral shape, e.g., as a printed conductor track, having a coil cross-section that is round, rectangular, or of any other shape. If the dimensional ratios differ, the ratios of the number of turns may be adjusted accordingly for optimal transmission.

The two HF instruments 1, 1' shown figuratively each have a handle 11, 11' with an HF instrument socket 12, 12', a shaft 13, 13', and a tool 14, 14'. The HF instrument socket 12, 12' is, as indicated by the block arrows, intended for connection to a plug connector 24 as an instrument-side connection device 24 of the relevant HF cable 2, 2', as indicated by the block arrows. The position of the instrument-side antenna 25 in relation to the HF instrument 1, 1' is determined by the arrangement of the HF instrument socket 12, 12' on the handle 11, 11'. The arrangement of an RFID transponder tag 15, 15' on the HF instrument 1, 1' may therefore be based upon the position of the HF instrument socket 12, 12' on the handle 11, 11'. The RFID transponder tag 15, 15' is therefore placed on or in the HF instrument 1, 1' such that it is within the range of the instrument-side antenna 25 when connected to the HF cable 2, 2'.

Therefore, an arrangement of the RFID transponder tag 15, 15' on the handle 11, 11' or on an end of the shaft 13, 13' that is close to the handle, i.e., proximal, is optimal. In the example shown, in a first HF instrument 1, an RFID transponder tag 15 is arranged at the end of the shaft 13 closest to the handle, and, in a second HF instrument 1', an RFID transponder tag 15' is arranged at a proximal end of the handle 11'. The distal tool 14, 14' of the HF instrument 1, 1' is often crucial for identification with respect to the HF generator 3, because the distal tool 14, 14' limits the voltage at which and how often an HF instrument 1, 1' can be operated. Shaft 13, 13', handle 11, 11', and the HF cable 2, 2' itself are typically configured to be robust enough to withstand more voltage than any tool 14, 14' that can be connected thereto.

In the case of one-piece HF instruments 1, 1', it is possible that all information relevant to operation, in particular also the information relevant to operation of the distal tool 14, 14', is stored on an RFID transponder tag 15, 15', which is arranged near the HF instrument socket 12, 12', i.e., on the handle 11, 11' or on the proximal end of the shaft 13, 13'. This is because, with one-piece HF instruments 1, 1', the combination of tool 14, 14', shaft 13, 13', and handle 11, 11' with HF instrument socket 12, 12' always remains the same.

However, if the HF instruments 1, 1' are modular HF instruments 1, 1', each having a handle 11, 11' with an HF instrument socket 12, 12', a shaft 13, 13', and a tool 14, 14', it is possible that the combination of tool 14, 14', shaft 13, 13', and handle 11, 11' with HF instrument socket 12, 12' differs for each application. An RFID transponder tag arranged, for example, on the handle 11, 11' is therefore not suitable for storing information on the operation of a distal tool 14, 14', because the handle 11, 11' can be combined with another tool 14, 14' to form a modular HF instrument 1, 1' each time it is used.

In order to be able to clearly and reliably identify a tool 14, 14' of a modular HF instrument 1, 1' by means of an RFID transponder tag 15, 15', there are several options when designing a modular HF instrument system:

One possibility is that the RFID transponder tag which is assigned to the tool 14, 14', i.e., on which information on the operation of the tool 14, 14' is stored, be arranged on or in the tool 14, 14' if the tool 14, 14' is a modular component which can be separated from the shaft 13, 13'. For example, the RFID transponder tag assigned to the tool 14, 14' may be arranged at a proximal connection point to the shaft 13, 13' if—depending upon the position of the HF instrument socket 12, 12', the length of the shaft 13, 13', and the strength of the RF field transmitted by the RFID reading unit 33—this connection region is within the range of the instrument-side antenna 25.

In addition, in the case of tools 14, 14' which, e.g., for opening and closing jaw parts, are connected to an actuating rod (not shown in the figure) which, after assembly of the modular HF instrument 1, 1', extends through the shaft 13, 13' into the handle 11, 11', it is possible to arrange an RFID transponder tag assigned to the tool 14, 14' at the proximal end of the actuating rod, which is located inside the handle 11, 11' and thus near the HF instrument socket 12, 12'.

A further variant consists in that the tool 14, 14' with a shaft 13, 13' forms a non-separable, modular component which may be assembled with different handles 11, 11' of an instrument system to form a modular HF instrument 1, 1'. Then, it is possible that the RFID transponder tag assigned to the tool 14, 14' may be arranged at the proximal end of the shaft 13, 13', which is intended for connection to the handle 11, 11'.

Not shown in the figure are variations in which a modular HF instrument 1, 1' has more than one RFID transponder tag. This may be used to identify not only the tool 14, 14', but also the other instrument components shaft 13, 13' and/or handle 11, 11' and, if applicable, the relevant HF cable 2, 2'. For this purpose, a second RFID transponder tag assigned to the shaft 13, 13' may be arranged on or in the shaft 13, 13', preferably at its proximal end closest to the handle. If the shaft 13, 13' forms an inseparable unit with a handle 11, 11', then such a second RFID transponder tag assigned to the shaft 13, 13' may alternatively also be arranged on or in the handle 11, 11', e.g., in the vicinity of the HF instrument socket 12, 12'. Furthermore, a third RFID transponder tag, which is assigned to the handle 11, 11', may also be arranged on or in the handle 11, 11'. A fourth RFID transponder tag assigned to the HF cable 2, 2' may be arranged on or in the HF cable 2, 2'—for example, on or in the instrument-side connection device 24 or adjacent thereto. Alternatively, an RFID transponder tag assigned to the HF cable 2, 2' may also be arranged on or in the generator-side plug connector 22, which can then be read directly by the RFID reading unit 33 of the socket 32 to which the HF cable 2, 2' is connected via the generator-side plug connector 22.

With the described HF device 4, a method according to the invention for identification by means of RFID signal transmission and for operating HF instruments 1, 1' on an HF generator 3 can be carried out, starting with the provision of an HF cable 2, 2', which has an RF transmission device 21', 21", in order to connect an HF instrument 1, 1', which has an RFID transponder tag 15, 15', to one of the HF sockets 32 of the HF generator 3, each of which is assigned an RFID reading unit 33.

The HF cable 2, 2' is at one end with its instrument-side connection device 24 separably connected to the HF instrument 1, 1' and at the other end with its generator-side plug connector 22 separably connected to the HF socket 32 of the HF generator 3. Then, the RF transmission device 21', 21" of the HF cable 2, 2' can transmit an RF field, generated by the RFID reading unit 33, to establish a communications connection via which the RFID transponder tag 15, 15' of the HF instrument 1, 1' and the RFID reading unit 33 which is assigned to the HF socket 32, which is separably connected to the HF instrument 1, 1' by the HF cable 2.

A data signal from the RFID transponder tag 15, 15' is detected by the RFID reading unit 33 via the communications connection. Because the data signal comprises at least one piece of information for identifying the HF instrument 1, 1', the RFID reading unit 33 or the assigned control unit 31 of the HF generator 3 can use the detected data signal to identify the HF instrument 1, 1' that is connected via the HF cable 2, 2' to the HF socket 32 to which the RFID reading unit 33 is assigned.

After identification has been completed, the HF device 4 is put into operational readiness, so that the identified HF instrument 1, 1' can be used in HF operation via the HF cable 2, 2'. Putting the HF device 4 into operational readiness may, for example, comprise enabling the HF voltage by the control unit 31 at the HF socket 32, which is connected to the identified HF instrument 1, 1' via the HF cable 2, 2'.

To establish the RF communications connection between the RFID transponder tag(s) 15, 15' of the HF instrument 1, 1' and the RFID reading unit 33, which is assigned to the HF socket 32 connected via the relevant HF cable 2, 2', the RF field generated by the RFID reading unit 33, which contains a polling signal, is transmitted with the generator-side antenna 23 via the RF transmission device 21', 21" of the HF cable 2, 2' to the instrument-side antenna 25. The RFID transponder tag 15, 15' of the connected HF instrument 1, 1' draws energy from the transmitted RF field for power supply during the communications process, decodes the polling signal, and encodes a response signal in the transmitted RF field, which is thereby modulated. This modulation of the RF field is detected via the HF cable 2, 2' by the RFID reading unit 33 and decoded as a response signal, which is processed by the RFID reading unit 33 or forwarded to the control unit 31 of the HF generator 3 for processing.

The identification of the HF instruments 1, 1', or the tools 14, 14' thereof and possibly other modular instrument components, by means of the exchangeable HF cable 2, 2' by the RFID reading unit(s) 33 of the HF generator 3 may be used to specify HF operating parameters and also to log usage. The RFID transponder tags may be placed on the module components, tool inserts or attachments, shafts, handles, and/or HF cables whose identification is important or of interest for the operation of the HF instrument. RFID transponder tags of several instrument components of an HF instrument 1, 1' connected via the HF cable 2, 2' may also be read or written (virtually) simultaneously. The HF generator 3, or the control unit 31, which is communicatively connected to the RFID reading units 33, of the HF generator 3 then receives a complete picture of which instrument components are currently connected together at the relevant HF socket 32.

Thus, in addition to the information for identifying the HF instrument 1, 1', the data signal may also comprise a limit specification for an HF operating parameter for the HF operation of the HF instrument 1, 1'. Examples of HF operating parameters may include a continuous operating HF voltage, a peak load HF voltage, a continuous operating HF power, peak load HF power, an HF operating time in continuous operation, an HF operating time in peak load, an HF operating frequency in continuous operation, and an HF operating frequency in peak load. Then, putting the HF device 4 into operational readiness may also include, for example, a display of the limit specification for the HF operating parameter for the HF operation of the HF instrument 1, 1' on a display device 34 of the HF generator 3. Preferably, however, the HF operation of the identified HF instrument 1, 1' may be limited with respect to the z HF operating parameter in accordance with the limit specification by a control unit 31, connected to the RFID reading unit 33, of the HF generator 3.

In addition to a voltage permissible for the relevant HF instrument 1, 1', further operating parameters may be stored on the RFID transponder tag, e.g., to protect the HF instrument 1, 1' from thermal overload, by storing the maximum transmitted energy per unit of time and a pause duration between high-energy applications. This means that a distinction can be made between continuous operating parameters and peak load operating parameters. In this way, it would be possible to temporarily enable HF instruments 1, 1' for higher peak powers than they can sustain in continuous operation, because the forced pauses reliably prevent overheating.

To store usage data such as usage counters on the RFID transponder tags 15, 15' of the HF instruments 1, 1', the RFID transponder tags 15, 15' may have a writable memory. Accordingly, the RFID reading units 33 of each HF socket 32 of the HF generator 3 are then also actively configured to write the usage data received from the control unit 31 of the HF generator 3 for the assigned HF socket 32.

The method may therefore comprise logging usage data by the RFID reader 33 during the HF operation of the HF instrument 1, 1', wherein the usage data relate to one or more HF operating parameters such as HF voltage, an HF power, an HF operating time, and an HF operating frequency. For this purpose, the RFID reading unit 33 writes the RFID transponder tag 15, 15' of the HF instrument 1, 1' with the logged usage data via the communications connection.

To write the RFID transponder tag 15, 15', the polling signal generated by the RFID reading unit 33 with the RF field contains the usage data with a corresponding instruction to store this in the memory of the RFID transponder tag 15, 15'.

The described method may also be advantageously used for identifying and operating modular HF instruments 1, 1', which have at least one RFID transponder tag 15, 15', which is assigned to the tool 14, 14' as the usually weakest instrument component. The data signal of the RFID transponder tag 15, 15', which is assigned to the tool 14, 14', comprises at least one piece of information for identifying the tool 14, 14' and, if applicable, limit specifications for an HF operating parameter for the HF operation of the tool 14, 14'. If the remaining instrument components of the modular HF instrument 1, 1' do not have any further RFID transponder tags 15, 15', the information for identifying the tool 14, 14' is understood as information for identifying the HF instrument 1, 1', and, accordingly, the limit specifications for the tool 14, 14' are understood as limit specifications for the instrument 1, 1'.

However, the method is also suitable for modular HF instruments 1, 1', in which each demountable instrument component has an RFID transponder tag. Thus, a first RFID transponder tag may be assigned to the tool 14, 14', a second to the shaft 13, 13', and a third to the handle 11, 11'. Accordingly, the first data signal of the first RFID transponder tag contains information for identifying the tool 14, 14', a second data signal of the second RFID transponder tag contains information for identifying the shaft 13, 13', and a third data signal of the third RFID transponder tag contains information for identifying the handle 11, 11'. Furthermore, a fourth RFID transponder tag assigned to the HF cable 2, 2' may be provided, the data signal of which contains information for identifying the HF cable 2, 2'. Accordingly, the modified method comprises detecting the first, second, and/or third data signals via the communications connection by the RFID reading unit 33 assigned to the HF socket 32 to which the modular HF instrument 1, 1' is connected via the HF cable 2, 2'.

Identifying the modular HF instrument 1, 1' then includes identifying the instrument components of tool 14, 14', shaft 13, 13', and/or handle 11, 11' from which the modular HF instrument 1, 1' is constructed.

This offers the possibility for the control unit 31 to check whether the combination of the instrument components of a connected modular HF instrument is permissible and at which voltage the modular HF instrument may be operated. If each instrument component has an assigned RFID transponder tag, it may contain not only information for identification and operating parameters, but also information on the compatibility of the relevant instrument component with other instrument components, from which the control unit 31 can, for example, distinguish a permissible combination of mutually compatible instrument components from an impermissible combination of incompatible instrument components. The HF generator 3 then supplies—via the relevant HF socket 32—only the HF voltage that the weakest instrument component, i.e., usually the tool 14, 14', can withstand to the HF instrument 1, 1 connected thereto via the HF cable 2, 2'. If the control unit 31 determines that individual instrument components preclude use with certain other instrument components, the HF generator 3 will not enable any voltage at the corresponding HF socket 32. This safely prevents the use of impermissibly combined instrument components, which previously has required mechanical coding of the individual instrument components.

In addition, the data signal of the RFID transponder tag assigned to an instrument component may include a corresponding limit specification for at least one HF operating parameter for the HF operation of the relevant instrument component. This means that the first data signal includes a first limit specification for the tool, the second data signal includes a second limit specification for the shaft, and the third data signal includes a third limit specification for the handle. Here as well, the HF operating parameters are selected from a group having at least a continuous operation HF voltage, a peak load HF voltage, a continuous operation HF power, a peak load HF power, an HF operating time in continuous operation, an HF operating time in peak load, an HF operating frequency in continuous operation, and an HF operating frequency in peak load.

In order to make the HF device 4 with a modular HF instrument 1, 1' ready for operation, the method may then comprise comparing the first, second, and third limit specifications for the HF operating parameter for the HF operation of the tool, the shaft, and the handle via the RFID reading unit 33 or the control unit 31 of the HF generator 3 connected thereto, in order to determine therefrom a common limit specification for the HF operating parameter for the HF operation of the modular HF instrument 1, 1'. Then, the common limit specification can be displayed on the display device 34 of the HF generator 3. Alternatively, the HF operation of the modular HF instrument 1, 1' may be limited with respect to the HF operating parameter according to the common limit specification via the control unit 31, connected to the RFID reading unit 33, of the HF generator 3.

The RFID transponder tags 15, 15' on the HF instrument 1, 1' may also be used to authenticate the instrument components on the HF generator, which helps protect against product piracy. In addition, the same RFID tags may be used for hospital logistics and for service and PLM purposes. Because the air interface parameters for RFID identification are usually defined in a standard, such as ISO/IEC 18000, for these purposes, the RF communication of the method according to the invention may preferably also be carried out in accordance with this standard. This means that all RFID transponder tags 15, 15', the RF transmission devices 21', 21", and the RFID reading units 33 of the HF device 4 for RF communication are configured in accordance with this standard. This means that all RFID transponder tags 15, 15' may also be used in other RFID systems in hospital logistics.

In principle, it may be provided that the RF communication between the RFID transponder tags 15, 15' of an HF instrument 1, 1' and the RFID reading unit 33 be performed via the relevant HF cable 2, 2' with a time delay relative to the HF operation of the HF instrument 1, 1', in order not to be affected by its electromagnetic influences.

The drawings, the description, and the claims contain numerous features in combination. It goes without saying that the aforementioned features can be used not only in the combination specified in each case, but also in other combinations or on their own, without departing from the scope of the present invention. The present invention provides a surgical HF device 4 and a method for identifying and operating surgical HF instruments 1, 1' using such a surgical HF device 4. The surgical HF device 4 is equipped with at least one surgical HF instrument 1, 1' and with an HF generator 3, which has at least one HF socket 32 for connecting the HF instrument 1, 1'. The HF generator 3 has at least one RFID reading unit 33 which is assigned to the at least one HF socket 32. The HF instrument 1, 1' has at least one RFID transponder tag 15, 15, and the HF device 4 has at least one HF cable 2, 2' with an instrument-side connection device 24 for separable connection to the HF instrument 1, 1'. It has a generator-side plug connector 22 for separable connection to the HF socket 32. The HF cable 2, 2' provides an RF transmission device 21', 21" which is configured to transmit an RF field generated by the RFID reading unit 33 as a communications connection between the at least one RFID transponder tag 15, 15' of the HF instrument 1, 1' and the RFID reading unit 33 which is assigned to the HF socket 32, which is separably connected to the HF instrument 1, 1' via the HF cable 2, 2'.

While specific embodiments of the invention have been shown and described in detail to illustrate the application of the principles of the invention, it will be understood that the invention may be embodied otherwise without departing from such principles.

LIST OF REFERENCE NUMBERS 1, 1' surgical HF instrument
2, 2' HF cable
3 HF generator
4 surgical HF device
11, 11' handle
12, 12' HF instrument socket
13, 13' shaft
14, 14' surgical tool
15, 15' RFID transponder tag
21 cable bundle
21' transmission device/communications line
21" transmission device/RFID signal amplifier
22 generator-side plug connector
23 generator-side antenna
24 instrument-side connection device/plug connector
25 instrument-side antenna
31 control unit
32 HF socket
33 RFID reading unit
34 display device

The invention claimed is:

1. A surgical HF device comprising:
at least one surgical HF instrument;
an HF generator, which comprises at least one HF socket for connecting the HF instrument, wherein the HF generator comprises at least one RFID reading unit which is assigned to the at least one HF socket, and the HF instrument comprises at least one RFID transponder tag; and
at least one HF cable comprising an instrument-side connection device for separable connection to the HF instrument and with a generator-side plug connector (22) for separable connection to the HF socket of the HF generator,
wherein the HF cable provides comprises an RF transmission device which is configured to transmit an RF field generated by the RFID reading unit as a communications connection between the at least one RFID transponder tag of the HF instrument and the RFID reading unit, which unit is assigned to the HF socket, which is separably connected to the HF instrument via the HF cable.

2. The surgical HF device according to claim 1, wherein the RF transmission device comprises:
a wired HF transmission device or a wireless RF transmission device; and
a generator-side antenna in or on the generator-side plug connector and an instrument-side antenna in or on the instrument-side connection device, wherein the generator-side antenna and the instrument-side antenna are in communicative connection.

3. The surgical HF device according to claim 2, wherein the wired RF transmission device for communicatively connecting the generator-side antenna and the instrument-side antenna has at least one communications line which extends along a cable bundle of the HF cable, and
the wireless RF transmission device for communicatively connecting the generator-side antenna and the instrument-side antenna has at least one RFID signal amplifier which is arranged in the HF cable and has a device for providing electrical energy from the RF field of the RFID reading unit or from an electromagnetic frequency field of an HF energy supply of the HF generator.

4. The surgical HF device according to claim 2, wherein the generator-side antenna has generator-side antenna dimensions adapted to dimensions of a generator antenna of the RFID reading unit and the instrument-side antenna has instrument-side antenna dimensions adapted to dimensions of a transponder antenna of the RFID transponder tag, and
wherein a number of turns of the generator-side antenna corresponds to a number of turns of the transponder antenna and a number of turns of the instrument-side antenna corresponds to a number of turns of the generator antenna.

5. The surgical HF device according to claim 1, wherein the HF instrument is a modular HF instrument which comprises a shaft, a tool, and a handle, wherein
the handle and the shaft are reversibly separably connected, and the shaft is inseparably connected to the tool, wherein the at least one RFID transponder tag is assigned to the tool and is arranged on or in the tool or on or in the shaft which is inseparably connected thereto, or
the tool and the shaft are reversibly separably connected, and the shaft is inseparably connected to the handle, wherein the at least one RFID transponder tag is assigned to the tool and is arranged on or in the tool, or
the handle and shaft and the tool are reversibly separably connected, wherein the at least one RFID transponder tag is assigned to the tool and is arranged on or in the tool.

6. The surgical HF device according to claim 5, wherein
a second RFID transponder tag is assigned to the shaft and is arranged on or in the shaft or the handle inseparably connected thereto, and/or
a third RFID transponder tag is assigned to the handle and is arranged on or in the handle, and/or
a fourth RFID transponder tag is assigned to the HF cable and is arranged on or in the HF cable.

7. The surgical HF device according to claim 1, wherein the RFID transponder tag has a writable memory, and the RFID reading unit is configured for reading and writing and is connected to a control unit of the HF generator.

8. A method for identifying and operating surgical HF instruments using a surgical HF device comprising: at least one surgical HF instrument; an HF generator, which comprises at least one HF socket for connecting the HF instrument, at least one RFID reading unit which is assigned to the at least one HF socket and at least one RFID transponder tag; and at least one HF cable, which comprises an instrument-side connection device for separable connection to the HF instrument, a generator-side plug connector for separable connection to the HF socket of the HF generator and an RF transmission device which is configured to transmit an RF field generated by the RFID reading unit as a communications connection between the at least one RFID transponder tag of the HF instrument and the RFID reading uni, which unit is assigned to the HF socket, which is separably connected to the HF instrument via the HF cable, the method comprising the steps of
providing the at least one HF cable with the RF transmission device for connecting the at least one HF instrument, which has the at least one RFID transponder tag, to the at least one HF socket of the HF generator, to which the at least one RFID reading unit is assigned,
separably connecting the instrument-side connection device of the HF cable to the HF instrument, and separably connecting the generator-side plug connector to the HF socket of the HF generator,
transmitting via the RF transmission device of the HF cable an RF field generated by the RFID reading unit as a communications connection between the at least one RFID transponder tag of the HF instrument and the RFID reading unit which is assigned to the HF socket, which is separably connected to the HF instrument by the HF cable,
detecting at least one data signal of the at least one RFID transponder tag by the RFID reading unit via the communications connection, wherein the data signal has at least one piece of information for identifying the HF instrument,
using the detected data signal to identify the HF instrument which is connected to the HF socket via the HF cable, to which socket the RFID reading unit is assigned, and
putting the HF device into operational readiness for the HF operation of the identified HF instrument.

9. The method according to claim 8,
wherein the data signal has at least one limit specification for at least one HF operating parameter for the HF operation of the HF instrument,
wherein the HF operating parameter is selected from a group having at least a continuous operation HF voltage, a peak load HF voltage, a continuous operation HF power, a peak load HF power, an HF operating time in continuous operation, an HF operating time in peak load, an HF operating frequency in continuous operation, and an HF operating frequency in peak load; and
wherein putting the HF device into operational readiness comprises:
displaying the at least one limit specification for the at least one HF operating parameter for the HF operation of the HF instrument on a display device (34) of the HF generator; and/or
limiting the HF operation of the identified HF instrument with respect to the at least one HF operating parameter corresponding to the limit specification by a control unit, connected to the RFID reading unit, of the HF generator.

10. The method according to claim 8, further comprising the steps of,
during HF operation of the HF instrument, logging of usage data by the RFID reading unit, wherein the usage data relates to at least one HF operating parameter from a group comprising at least one HF voltage, an HF power, an HF operating time, and an HF operating frequency, and,
via the communications connection by the RFID reading unit, writing the at least one RFID transponder tag of the HF instrument with the logged usage data.

11. The method according to claim 8,
wherein the HF instrument is a modular HF instrument, the first RFID transponder tag of which is assigned to the tool and which has a second RFID transponder tag assigned to the shaft and/or a third RFID transponder tag assigned to the handle,
wherein a first data signal of the first RFID transponder tag comprises information for identifying the tool, a second data signal of the second RFID transponder tag comprises information for identifying the shaft, and a third data signal of the third RFID transponder tag comprises information for identifying the handle, and the first, second, and/or third data signals are detected via the communications connection by the RFID reading unit, and identifying the modular HF instrument which is connected via the HF cable to the HF socket to which the RFID reading unit is assigned comprises identifying the tool, the shaft, and/or the handle from which the modular HF instrument is constructed.

12. The method according to claim 11,
wherein the first data signal comprises at least a first limit specification for at least one HF operating parameter for the HF operation of the tool, and the second data signal comprises at least a second limit specification for at least one HF operating parameter for the HF operation of the shaft, and the third data signal comprises at least a third limit specification for at least one HF operating parameter for the HF operation of the handle,
wherein the HF operating parameter is selected from a group comprising at least a continuous operation HF voltage, a peak load HF voltage, a continuous operation HF power, a peak load HF power, an HF operating time in continuous operation, an HF operating time in peak load, an HF operating frequency in continuous operation, and an HF operating frequency in peak load; and
wherein putting the HF device into operational readiness comprises:
comparing the first, second, and third limit specifications for the at least one HF operating parameter for the HF operation of the tool, the shaft, and the handle by the RFID reading unit or a control unit of the HF generator connected thereto, and determining therefrom a common limit specification for the at least one HF operating parameter for the HF operation of the modular HF instrument; and
displaying the common limit specification for the at least one HF operating parameter for the HF operation of the modular HF instrument on a display device of the HF generator; and/or
limiting the HF operation of the modular HF instrument with respect to the at least one HF operating parameter in accordance with the common limit specification by the control unit, connected to the RFID reading unit, of the HF generator.

13. The method according to claim 8, wherein the communications connection between the at least one RFID transponder tag of the HF instrument and the RFID reading unit which is assigned to the HF socket, which is separably connected to the HF instrument by the HF cable, and putting the HF device into operational readiness for HF operation of the identified HF instrument do not take place simultaneously.

* * * * *